United States Patent
Tanpoco et al.

(10) Patent No.: US 7,797,228 B2
(45) Date of Patent: *Sep. 14, 2010

(54) SYSTEM AND METHOD FOR CALCULATING AND DISPLAYING VOLUME TO IDENTIFY BUYING AND SELLING IN AN ELECTRONIC TRADING ENVIRONMENT

(75) Inventors: Alvin F. Tanpoco, Chicago, IL (US); Robert A. West, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/490,049

(22) Filed: Jun. 23, 2009

(65) Prior Publication Data

US 2010/0010929 A1    Jan. 14, 2010

Related U.S. Application Data

(63) Continuation of application No. 11/370,693, filed on Mar. 8, 2006, now Pat. No. 7,565,318.

(60) Provisional application No. 60/694,777, filed on Jun. 28, 2005.

(51) Int. Cl.
*G06Q 40/00* (2006.01)
*G06F 17/00* (2006.01)
*G06F 1/00* (2006.01)
*G09G 5/22* (2006.01)
*G09G 5/24* (2006.01)
*G06F 3/048* (2006.01)

(52) U.S. Cl. .................. 705/37; 715/764; 715/774; 715/781; 715/810; 715/811; 345/418; 345/440.1; 345/440.2; 345/469; 345/619

(58) Field of Classification Search .................. 705/37; 715/764, 774, 781, 811, 810; 345/418, 440.1, 345/440.2, 469, 619
See application file for complete search history.

(56) References Cited

U.S. PATENT DOCUMENTS

| | | |
|---|---|---|
| 5,924,083 A | 7/1999 | Silverman |
| 6,260,025 B1 | 7/2001 | Silverman |
| 6,272,474 B1 | 8/2001 | Garcia |
| 6,574,600 B1 | 6/2003 | Fishman et al. |

(Continued)

OTHER PUBLICATIONS

Thomas R. DeMark, The New Science of Technical Analysis (1st ed 1994).

(Continued)

*Primary Examiner*—James P Trammell
*Assistant Examiner*—Daniel L Greene, Jr.
(74) *Attorney, Agent, or Firm*—McDonnell Boehmen Hulbert & Berghoff LLP (57) ABSTRACT

A system and method are provided for calculating and displaying volume to identify aggressive buying or selling activity. In a preferred embodiment, market information such as the inside market, last traded price, and last traded quantity is received from the electronic exchange and is used to assist a trader in determining the initiative side of a trade, either bid side or ask side. Once a determination is made, the result may be used to assist a trader analyzing the market volume. Other features and advantages are described herein.

21 Claims, 8 Drawing Sheets

U.S. PATENT DOCUMENTS

| | | |
|---|---|---|
| 7,403,921 B2 | 7/2008 | Tanpoco et al. |
| 2002/0069156 A1 | 6/2002 | Adam et al. |
| 2002/0077954 A1 | 6/2002 | Slaight et al. |
| 2002/0120559 A1 | 8/2002 | O'Mara et al. |
| 2003/0088501 A1 | 5/2003 | Gilbert |
| 2003/0139989 A1 | 7/2003 | Churquina |
| 2004/0225592 A1 | 11/2004 | Churquina |
| 2005/0021443 A1 | 1/2005 | Beard et al. |
| 2005/0075965 A1 | 4/2005 | Cutler |
| 2005/0080710 A1 | 4/2005 | Malato et al. |
| 2005/0171891 A1 | 8/2005 | Daley et al. |
| 2005/0187854 A1 | 8/2005 | Cutler et al. |
| 2005/0228735 A1 | 10/2005 | Duquette |
| 2006/0293997 A1 | 12/2006 | Tanpoco et al. |
| 2007/0022036 A1 | 1/2007 | Korznin |

OTHER PUBLICATIONS

World Intellectual Property Organization, Securities Market and Market Maker Activity Tracking System and Method (visited Jan. 24, 2007), http://www.wipo.int.

International Search Report for PCT/US06/24926.

| Trade # 502 | BidQty 504 | BidPrc 506 | AskPrc 508 | AskQty 510 | TradePrc 512 | TradeQty 514 | OBV 516 | CVD 518 |
|---|---|---|---|---|---|---|---|---|
| 0 | 100 | 54 | 55 | 100 | 54 | 17 | 500 | 500 |
| 1 | 90 | 54 | 55 | 100 | 54 | 10 | 500 | 490 |
| 2 | 70 | 53 | 54 | 100 | 53 | 20 | 480 | 470 |
| 3 | 70 | 52 | 53 | 88 | 53 | 12 | 480 | 482 |
| 4 | 70 | 52 | 53 | 73 | 53 | 15 | 480 | 497 |
| 5 | 70 | 52 | 53 | 58 | 53 | 20 | 480 | 517 |
| 6 | 70 | 52 | 53 | 45 | 53 | 13 | 480 | 530 |

| E-Mini Equity Index |||||
|---|---|---|---|---|
| Tradeable Object 802 | Last Traded Price 804 | Point Value 806 | Tradeable Object Value 808 | Tradeable Object Weight 810 |
| E-Mini S&P 500 | 1272.00 | $50.00 | $63,600 | 25.76% |
| E-Mini Nasdaq 100 | 1688.00 | $20.00 | $33,760 | 13.76% |
| E-Mini Russell 2000 | 720.80 | $100.00 | $72,800 | 29.49% |
| E-Mini MidCap 400 | 767.20 | $100.00 | $76,720 | 31.08% |

Figure 8

SYSTEM AND METHOD FOR CALCULATING AND DISPLAYING VOLUME TO IDENTIFY BUYING AND SELLING IN AN ELECTRONIC TRADING ENVIRONMENT

CROSS-REFERENCE TO RELATED APPLICATIONS

The present application is a continuation of U.S. patent application Ser. No. 11/370,693, now issued as U.S. Pat. No. 7,565,318, filed Mar. 8, 2006 in the name of Tanpoco et al., entitled "System and Method for Calculating and Displaying Volume to Identify Buying and Selling in an Electronic Trading Environment," which itself claimed priority under 35 U.S.C. §119(e) to U.S. Provisional Patent Application Ser. No. 60/694,777, filed Jun. 28, 2005, entitled "Analyzing Volume to Identify Accumulation and Distribution."

FIELD OF INVENTION

The present invention is directed towards electronic trading. More specifically, the present invention is directed towards a method for calculating and displaying traded volume information in an electronic trading environment.

BACKGROUND

An exchange is a central marketplace with established rules and regulations where buyers and sellers, referred to as traders, meet to trade. Some exchanges, referred to as open outcry exchanges, operate using a trading floor where buyers and sellers physically meet on the floor to trade. Other exchanges, referred to as electronic exchanges, operate by an electronic or telecommunications network. An electronic exchange typically provides computerized matching between traders. Some example electronic exchanges include European Exchange ("Eurex"), London International Financial Futures and Options Exchange ("LIFFE"), Chicago Mercantile Exchange ("CME"), and Chicago Board of Trade ("CBOT").

With respect to electronic exchanges, traders connect to an electronic trading platform by way of a communication link through their user terminals. Once connected, traders typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

User terminals (also referred to as client devices) are connected to the electronic trading platform by way of a communication link to facilitate electronic messaging between the trading entities and the exchange. The messaging includes market information that is distributed from the electronic exchange to traders, as well as orders, quotes, acknowledgements, fills, cancels, deletes, cancel and replace, and other well-known financial transaction messages. Although the amount or type of market information published by the exchange often differs, there are some standard pieces of information. Market information may include data that represents just the inside market which refers to the lowest sell price (best ask) and the highest buy price (best bid) at a particular point in time. Market information may also include market depth, which refers to quantities available at the inside market and can also refer to quantities available at other prices away from the inside market.

Once the client device receives the market information, it may be displayed on the trading screen. Upon viewing the market information, traders can take certain actions including the actions of sending buy or sell orders to the electronic exchange, adjusting existing orders, deleting orders, or otherwise managing orders. There are a variety of different order types that a trader can enter in the electronic market. Traders may also use software tools to chart and graphically display the received market information or information calculated using the market information.

Over the years, a number of these software tools, in the form of analysis systems and graphical charting displays, have been created to assist traders in analyzing and attempting to predict market behavior. By providing such information, traders are generally able to assimilate enormous amounts of data and make more informed decisions. The use of such tools has also enhanced the level of intuition a trader may gain when trading in an electronic trading environment.

A conventional method of assimilating market information received from an exchange is, for example, to chart the information in a graphical display. Many different methods of charting market information are used by traders, such as historical or real time market data charts, pie charts, bar charts, or traditional candlestick charts. Similarly, many different types of market information can be charted, for example, volume, price vs. time, or last traded quantity. Traders often use the charted market information to assist them in identifying market patterns and market trends.

A common method of analyzing the volume and market activity is by watching time and sales prints as trades are posted. This method of volume analysis has traditionally been known as "tape reading." Practitioners watch the trades occurring in real time, looking for clues as to which side of the market (buy or sell) large trades are occurring on, observing the relative speed of the trades, the responsiveness of the other side as a large (or small) trade occurs, etc. The information flow is internalized by the trader over time, and the knowledge helps the trader decide how and when to respond.

However, this decision making approach is extremely subjective, and requires many hours of observation to understand and effectively apply the approach. Also, if a trader leaves his screen and does not view market activity for some time, their relative baseline framework will be lost, and upon their return it will take the trader more time to get back up to speed.

Another traditional method of analyzing volume information, which may be considered an improvement by some to the "tape reading" method, is to create a running total volume of the difference between the buying volume and the selling volume commonly referred to as On Balance Volume ("OBV"). The OBV method adds or subtracts each traded volume to or from the running total volume based on relative price movement between the current trade and the last trade. For example, if the current traded price is higher than the last traded price, then the volume associated with the current trade is added to the running total volume. If the current traded price is lower than the last traded price, then the volume associated with the current trade is subtracted from the running total volume. The OBV running total volume is then charted or graphically displayed on a trading chart alongside market prices, which can be similar or different than the charted market prices.

While the previously described methods used for analyzing volume have provided traders with valuable information, it is desirable to offer an improved method for volume analysis that provides more accurate information regarding the trading activity of the tradeable object.

BRIEF DESCRIPTION OF DRAWINGS

Many aspects of the present embodiments may be better understood with reference to the following drawings. The components in the drawings are not necessarily to scale, emphasis instead being placed upon illustrative example embodiments.

DETAILED DESCRIPTION

I. Overview

The example embodiments described herein provide a quantifiable approach to analyzing traded volume. The example embodiments introduce a method of calculating and displaying traded volume, to determine the aggressiveness towards either the bid or ask side of the market more intelligently than the traditional methods. This method of calculating traded volume is referred to hereinafter as Cumulative Volume Delta ("CVD"). The CVD traded volume analysis involves adding or subtracting the volume associated with each trade from a running total volume. The decision to add or subtract the volume from the running total volume is based on what side of the market each trade was initiated on. If the current trade was initiated on the ask side of the market, which indicates buying activity, then the volume associated to the trade is added to the running total volume. Likewise, if the current trade was initiated on the bid side of the market, which indicates selling activity, the volume associated with the trade is subtracted from the running total volume.

According to the example embodiments, the raw market information received from the electronic exchange is used to determine which side of the market the trade was initiated on using an algorithm. However, it should be understood that some exchanges may provide this information, in which case, a determination is not made. Regardless of what raw market information is provided from the exchange, the CVD method may be applied. Additionally, tracking which side of the market the trade is initiated on provides some of the elements used to chart the levels of buying activity versus selling activity in the market.

The example embodiments also introduce the CVD indicator which displays the running total volume calculated using the market information provided from the electronic exchange. The CVD method helps a trader to determine whether volume was initiated on the bid or ask side, instead of only highlighting if the market is going up or down, as many common trading charts display. An additional advantage of the CVD method is that it is it determines the initiate state for all trades, whereas the OBV method only compares the trades that alter the last traded price. The CVD indicator provides important information to a trader, such as if the market has aggressive buying pressure or aggressive selling pressure in a novel and more accurate way than using the traditional methods.

While the present invention is described herein with reference to illustrative embodiments, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

Figure 1:
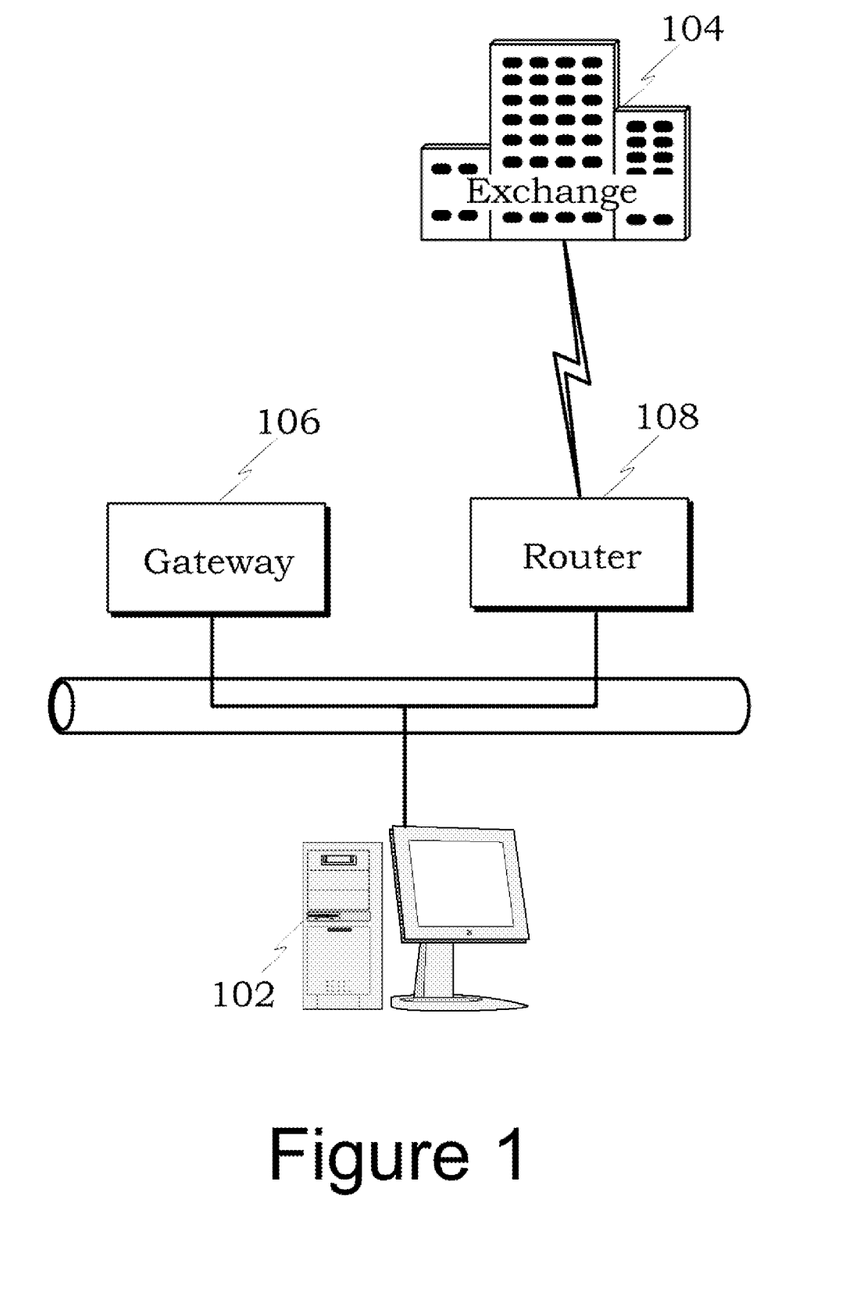
FIG. 1 is a block diagram illustrating a trading system for electronic trading according to an example embodiment, where the trading system includes a trading station where a trader can submit bids and asks for a tradeable object being traded at an electronic exchange.

FIG. 1 illustrates an example electronic trading system in which the example embodiments described herein may be employed. In this example, the system comprises a trading station 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trade. While not shown in the figure for the sake of clarity, the trading system may include other devices that are specific to the client site like middleware and security measures such as firewall, hubs, security managers, and so on, as understood by a person skilled in the art.

The computer employed as the trading station 102 generally can range from a hand-held device, laptop, or personal computer to a larger computer such as a workstation and multiprocessor. Generally, the trading station 102 includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading station 102 and will be able to select an appropriate system.

The computer employed as the gateway 106 generally can range from a personal computer to a larger computer. Generally, the gateway 106 may additionally include a monitor (or any other output device), input device (for example, a keyboard, mouse, etc.), and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a trading station or a gateway generally includes a central processing unit, a memory unit (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. For example, the CVD method may be carried out at the trading station 102 based on market information received from the electronic exchange 104. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system; these illustrations are meant to be helpful to the reader and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration (not shown in the Figures), the client site may be located on the actual grounds of the electronic exchange (for example, in the building of the exchange). According to this example illustration, the trading station 102, the gateway 106, and the router 108 may still communicate over a local area network, but the router 108 may communicate with the matching process at the electronic exchange through another connection means besides a T1, T3, or ISDN.

In yet another example illustration (not shown in the Figures), the gateway 106 may be housed at, or near, its corresponding electronic exchange 104. According to this instance, the trading station 102 may communicate with the gateway 106 over a wide area network or through the use of a T1, T3, ISDN, or some other high speed connection.

In another example illustration (not shown in the Figures), the gateway 106 may be located remote from the trading station 102 and remote from the electronic exchange 104, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

III. A Second Example Trading System

Figure 2:
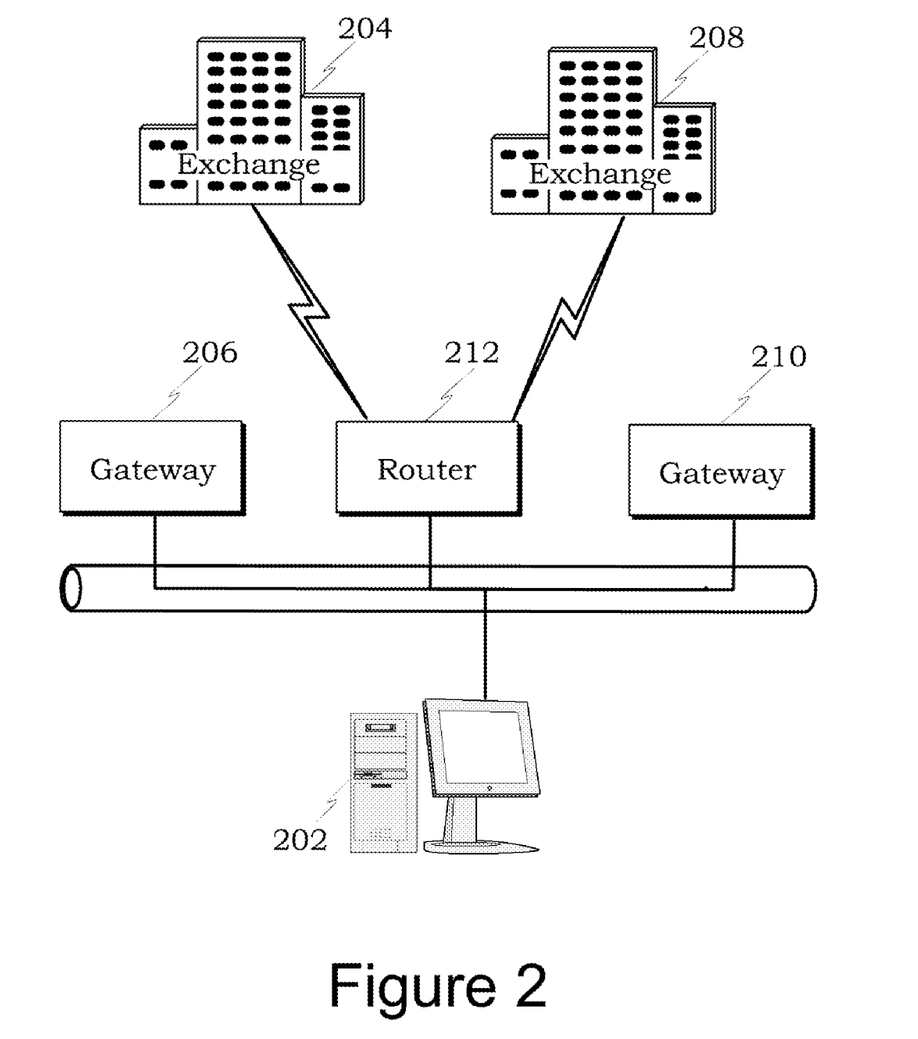
FIG. 2 is a block diagram illustrating a trading system for electronic trading that builds on the trading system shown in FIG. 1 and includes a trading station where a trader can submit bids and asks for a tradeable object being traded at more than one electronic exchange.

FIG. 2 illustrates another example trading system that uses similar computer elements as shown in FIG. 1, in which, the example embodiments described herein may be employed to trade at multiple electronic exchanges as well as to calculate CVD. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange trading environment. For example, a trader could view market information from each tradeable object through one common visual display. As such, price and quantity information from the two separate exchanges may be presented together so that the trader can view both markets simultaneously in the same window. Similarly, the trader may also view the charted CVD indicator or the calculated CVD value for each of the electronic exchanges using the CVD method described herein.

As indicated earlier, one skilled in the art of electronic trading systems will understand that the present embodiments are not limited to the particular configurations illustrated and described with respect to FIG. 1 and FIG. 2, and will be able to design a particular electronic trading system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

IV. An Example Trading System and Function

Figure 3:
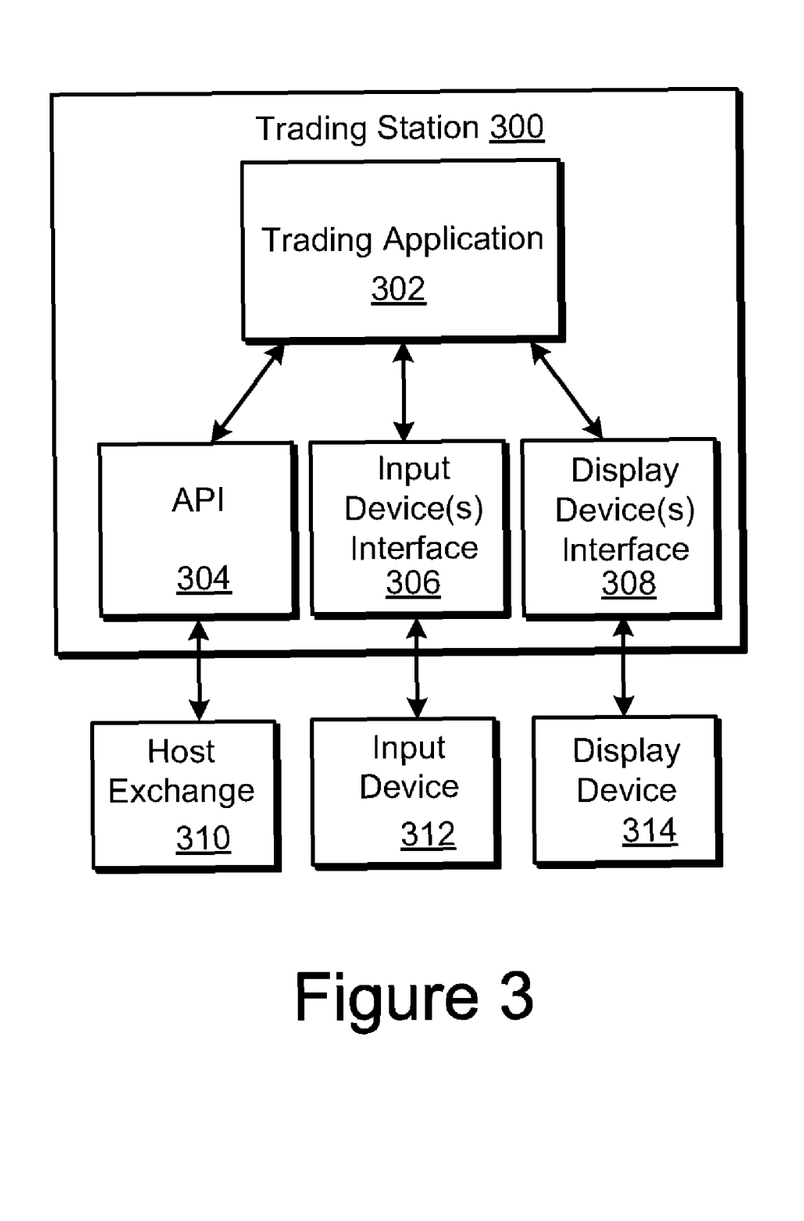
FIG. 3 is a block diagram illustrating various components of an example trading station that a trader can use to submit trades for a tradeable object being traded at one or more electronic exchanges and to display trading information in a chart.

FIG. 3 illustrates an overview of a trading station 300 which is similar to the type of trading stations 102 and 202 shown in FIGS. 1 and 2. Trading station 300 can be any particular type of computing device, examples of which were enumerated above. According to one example embodiment, trading station 300 has a trading application 302 stored in memory that when executed arranges and displays market information, such as a chart containing a CVD indicator, on a trading screen that will be described in greater detail below.

Preferably, trading application 302 has access to market information from one or more exchanges 310 through API 304 (or application programming interface), and trading application 302 can also forward transaction information to exchange 310 via API 304. Alternatively, API 304 could be distributed so that a portion of the API rests on the trading station 300 and a gateway similar to the type of gateways 106, 206, and 210 shown in FIG. 1 and FIG. 2, or at the exchange 310. Additionally, trading application 302 may receive signals from input device 312 via input device interface 306 and can be given the ability to send signals to display device 314 via display device interface 308.

Alternatively, the example embodiments described herein may be a separate program from trading application 302, but still stored in memory and executed on the trading station 300. In another alternative embodiment, the preferred embodiments may be a program stored in memory and executed on a device other than trading station 300. Example devices may include a gateway or some other well known intermediary device.

The trading station 300 may use software that creates trading screens or charts, on the trading station 300. The trading screen enables the user to enter and execute orders, obtain market quotes, and monitor positions. The trading charts allow traders to analyze market information in a visual display, such as a CVD indicator. The range and quality of features available to the trader on his or her trading screens vary according to the specific software application being run.

V. Cumulative Volume Delta

As trades occur in the market, it is useful for a trader to know how much volume is being traded as well as how much volume is associated to each side of the market: bid side or ask side. According to the CVD method, the initiative nature of each trade, whether the trade occurred on the bid or ask, is used to determine if the quantity associated with that trade should be added to or subtracted from the running total volume. The traditional OBV only compares the relative price movement between the last traded price and the previous last traded price to determine if the volume should be added to or subtracted from the running total volume. Differences between the CVD method and the traditional OBV method will be shown and described in further detail in reference to FIGS. 5 and 6.

Figure 4:
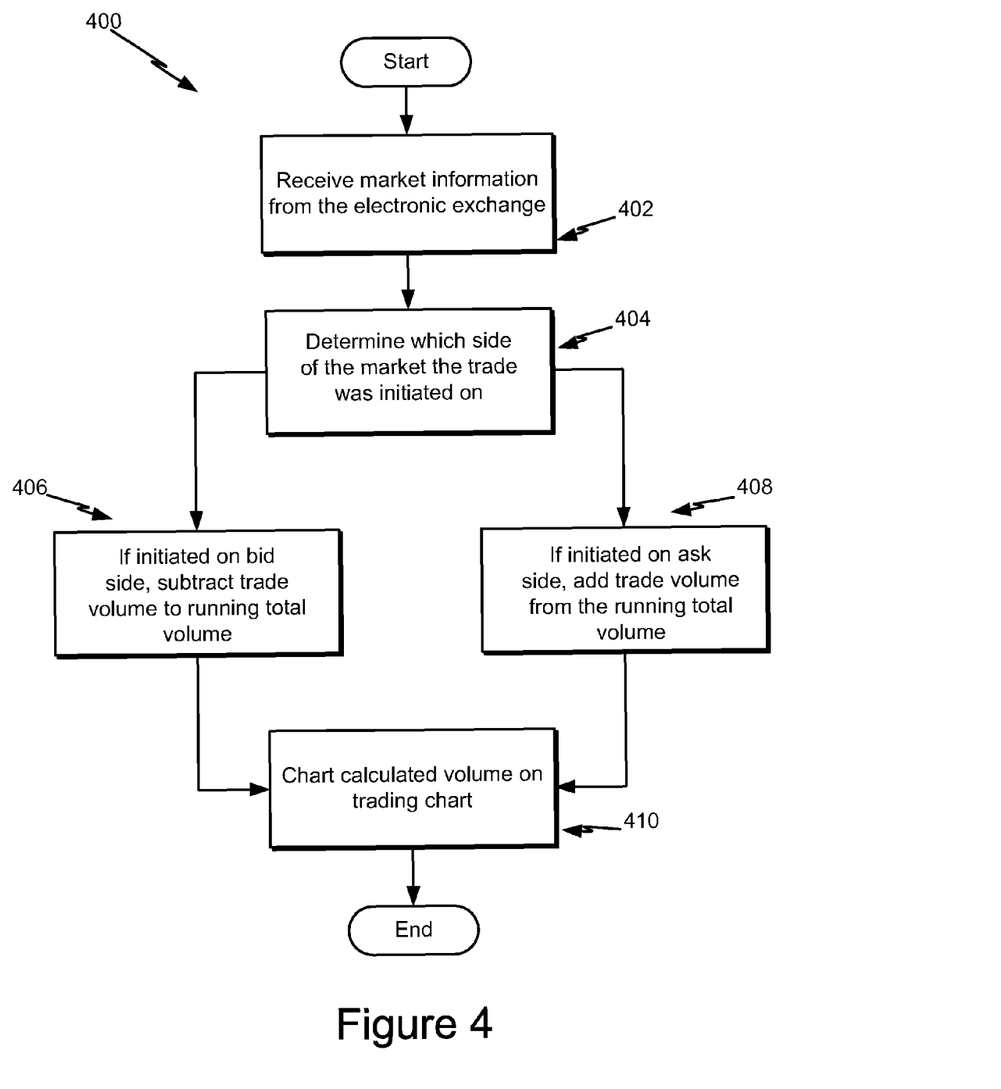
FIG. 4 is a flow chart illustrating a method for calculating Cumulative Volume Delta according to an example embodiment.

FIG. 4 is a flow chart illustrating an example embodiment for calculating CVD. It should be understood that the flow chart in FIG. 4 only provides an illustrative description for calculating and displaying a CVD indicator. In this regard, each block may represent a module, segment, or portion of code, which includes one or more executable instructions for implementing specific logical functions or steps in the process. Further, it should be understood that the steps of the method illustrated in FIG. 4 may be performed by one or more network entities, such as a client device, gateway, and/or exchange, or a combination thereof, using the teachings described herein.

At step 402, the trading application, such as one described in reference to FIG. 1, 2, or 3, receives market information from the electronic exchange, also shown in FIG. 1, 2, or 3. As previously described, the market information may include the inside market, last traded price and last traded quantity.

At step 404, the trading application uses the market information received from the electronic exchange to determine whether the trade was initiated on the bid or ask side. This determination is accomplished by comparing the last traded price to the best bid and best ask prices of the inside market. If the last traded price is equal to the best bid price, then the last trade is considered to be on the bid side and is associated with selling pressure in the market. If the last traded price is equal to the best ask price, then the last trade is considered to be on the ask side and is associated with buying pressure in the market. If the last traded price is outside of the inside market, then the CVD method may handle the trade in a variety of ways. For example, the CVD method may choose to not calculate or chart a CVD value for that trade. Another way to handle a trade that is outside of the inside market, may be to compare the last traded price to the inside market and if the last traded price is below the best bid, consider it to be on the bid side, and if the last traded price is higher than the best ask, consider it to be on the ask side. Similarly, if a gap exists between the inside market prices, the CVD method may choose to not calculate or chart a CVD value for the last trade, or it could check which inside market price, bid or ask, most recently populated the price level or the last trade.

At step 406, if the trading application has determined that the last trade was initiated on the bid side of the market, then the quantity associated to the last trade is subtracted from the running total volume. The trading application then moves to step 410.

At step 408, if the trading application has determined that the last trade was initiated on the ask side of the market, then the quantity associated with the last trade is added to the running total volume. The trading application then moves to step 410.

When CVD is tracked for the first time, the running total volume value may start at "0" and build from there as volume is traded for that specific tradeable object. As CVD is tracked starting at the beginning of a trading day (or at some other time period), the volume value may start from where the volume ended the previous day (or the previous time), thus creating a continuous historical CVD chart. The volume value may also be user-configured, and in which case, the calculations would start from the user-defined value.

At step 410, if charting is enabled, the trading application has completed the CVD method calculations and will chart the calculated CVD indicator. It should be understood that the CVD indicator does not have to be charted and that step 410 is configurable by the trader. For example, the CVD indicator may be used in a spread sheet, as a value on the screen, as any other type of indicator, or used in a trading strategy.

Figure 5:
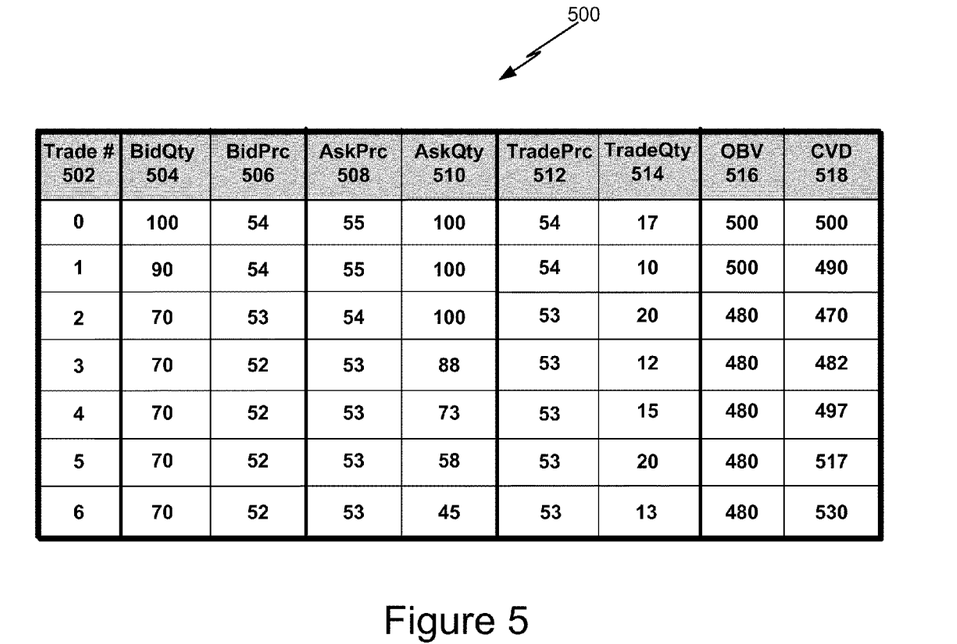
FIG. 5 is a table illustrating market information used to calculate Cumulative Volume Delta, according to the example embodiment of FIG. 4, and traditional On Balance Volume.

To illustrate some differences between CVD and OBV, FIG. 5 provides a table illustrating example market information used to calculate CVD and OBV. The calculations shown in table 500 are based on the analysis of six consecutive trades for the same tradeable object. Table 500 includes a Trade# column 502, BidQty column 504, a BidPrc column 506, an AskPrc column 508, an AskQty column 510, a TradePrc column 512, a TradeQty column 514, an OBV column 516, and a CVD column 518. The information in columns 504-514 would normally be provided by the electronic exchange. The Trade# column 502 displays the number corresponding to the order of each trade, the BidQty column 504 displays the quantity of the best bid, the BidPrc column 506 displays the price level of the best bid, the AskPrc column 508 displays the price level of the best ask, the AskQty column 510 displays the quantity of the best ask, the TradePrc column 512 displays the price at which a trade is submitted at, the TradeQty column 514 displays the quantity of the submitted trade, the OBV column 516 displays the calculated total volume value using the OBV method, and the CVD column 518 displays the calculated total volume value using the CVD method.

Referring to FIG. 4 using the information provided in table 500 shown in FIG. 5, trading application, as described in reference to FIG. 1, 2, or 3, starts with Trade 0 (Trade# column 502) having already occurred at a price level of "54" (TradePrc 512), and has a quantity of "17" (TradeQty column 514) in the market. At the time of Trade 0, the best bid was at a price level of "54" (BidPrc column 506) and best ask price of "55" (AskPrc column 508). Also associated with Trade 0, is a running total volume value of "500" being used as the starting volume for each method as shown in, OBV column

516 and CVD column 518. The market information corresponding to Trade 0 is provided for the purposes of calculating OBV.

Per step 402 shown in FIG. 4, market information corresponding to Trade 1 is received from the electronic exchange. At that time, the best bid is at a price level of "54" (BidPrc column 506), and has a quantity of "90" (BidQty column 504). Similarly, the best ask is at a price of "55" (AskPrc column 508), and has a quantity of "100" (AskQty column 510).

Per step 404 shown in FIG. 4, Trade 1 is determined to be a trade on the bid side because the BidPrc 506 of "54" is equal to the TradePrc 512 of "54", shown in the second row of table 400. In other words, the trade price of Trade 1 is compared to the inside market. Since the trade price of Trade 1 is equal to the bid price of the inside market, the quantity associated with Trade 1 is subtracted from CVD column 518. Referring to chart 500, Trade 1 is submitted at the price level of "54" (TradePrc 512), and has a quantity of "10" (TradeQty 514). At the time of Trade 1, the inside market has a bid at "54" (BidPrc 504) and an ask at "55" (AskPrc 506).

Based on the CVD method, Trade 1 (Trade# column 502) was determined to be made on the bid side of the market because the BidPrc 506 of "54" is equal to the TradePrc 512 of "54". Per step 408 in FIG. 4, the quantity associated with the Trade 1 is subtracted from the CVD running total in the CVD column 518. According to the CVD method, the total volume would be calculated as follows:

CVD 518−TradeQty 514=total volume
Trade 1: 500−10=490

Based on the OBV method of calculating volume, the trade price of Trade 1 is compared to the last traded price of Trade 0, which is "54". OBV does not recognize a price change between the last traded price and the current trade price. Because there is not a price change between the last traded price and the current trade price, the OBV does not make a calculation and the running total volume remains the same.

Market information is again received from the electronic exchange, including the information corresponding to Trade 2 (Trade# column 512) per step 402. At the time, the best bid is at a price level of "53" (BidPrc column 506), and has a quantity of "70" (BidQty column 504). Similarly, the best ask is at a price level of "54" (BidPrc column 506), and has a quantity of "100" (BidQty column 504).

At step 404, the trading application determines whether or not to add or subtract the last traded quantity from running total volume and because the last traded price of Trade 2 is equal to the best bid price, BidPrc 506, the trade is on the bid side and is subtracted. The following calculations are made using the CVD method.

CVD 518−TradeQty 514=total volume
Trade 2: 490−20=470 (at Step 408)

Based on the OBV method of calculating volume, the trade price of Trade 2 is compared to the last traded price of Trade 1, which is "54". OBV recognizes a price difference between the last traded price and the previous last traded price and then subtracts the quantity associated with Trade 2. OBV however, still does not take into account the side of the market Trade 2 was made on, but only the relative difference between prices.

OBV 516−TradeQty 514=total volume
Trade 2: 500−20=480

Chart 500 now displays the market information for the next four trades (Trades 3, 4, 5, and 6) which are submitted to the market at the same price level of "53", all on the ask side of the market. As shown in FIG. 5, CVD adds all of the quantity to the CVD 518 running total volume because, although all the trades are submitted at the same price level, they all occurred on the ask side of the market, specifically at the best ask price. OBV does not recognize a change in prices and therefore remains the same over the next four trades.

Referring back to specific examples shown in FIG. 5, market information corresponding to Trade 3, Trade# column 502, is now received from the electronic exchange. At the time, the best bid is at a price level of "52" (BidPrc column 506), and has a quantity of "70" (BidQty column 504). Similarly, the best ask is at a price level of "53" (AskPrc column 508), and has a quantity of "88" (AskQty column 510).

Per step 404, Trade 3 is submitted at the price level of "53" (TradePrc 512), and has a quantity of "12" (TradeQty 514). Trade 3 is determined to be a trade on the ask side because it is equal to the best ask price "53" (AskPrc column 508) and the associated quantity is then added to the CVD running total CVD 518.

Based on the CVD method, because Trade 3 was made on the ask side, CVD is calculated using the quantity associated to Trade 3 as follows:

CVD 518+TradeQty 514=total volume
Trade 3: 470+12=482 (step 406)

The following trades, Trades 4-6, Trade# 502, are calculated using the CVD method as follows:

CVD 518+TradeQty 514=total volume
Trade 4: 482+15=497 (step 406)
Trade 5: 497+20=517 (step 406)
Trade 6: 517+13=530 (step 406)

Adding the quantities associated to the last four trades to the CVD running total causes the CVD running total volume in the CVD column 518 to increase. CVD data will provide an illustrated view, displaying that although the price at which trades were initiated and matched did not change, a buying activity occurred in the market. The last 4 trades were submitted at the same price level, so the market movement was horizontal instead of upward or downward. It is also during the times of horizontal market movement that traders need a tool to help identify buying activity (trades placed on the ask side of the market) or selling activity (trades placed on the bid side of the market) during the horizontal market movement.

The result of the OBV method can be misleading and counterintuitive to a trader if used as a tool for volume analysis. For example, during the last four trades, the trader would see horizontal movement and not any upward or downward movement in the OBV chart because the trades were all initiated at the same price as the last traded price. However, the CVD chart will clearly illustrate that traders are aggressively submitting ask trades to the market. CVD provides the trader with a more accurate representation of the true buying and selling activity taking place in the market. OBV does not recognize a price change between the last traded price and the current trade price. OBV simply provides information about the running total volumes and does not take into account the side that a trade is initiated on and therefore remains the same when there is not a difference in the inside market prices and the current trade price.

VII. Charting CVD

In addition to using the CVD method to calculate a CVD value, CVD may be charted for a trader to visually analyze. A CVD indicator can be charted over any period of time depending on a trader's desires. It should be understood that the method of displaying and charting the CVD indicator is configurable by the trader and is not limited to the example embodiments described herein.

A trader can chart the CVD indicator on any of the traditional charts such as, historical, real-time, candlestick. A CVD indicator can also be charted as a derivative of the CVD value such as, absolute value, average, slope, etc. A trader can also analyze the charted CVD indicator using the same traditional methods of analyzing other charts or graphical displays. One method to analyze a chart is to look for confirmation and divergence between price and the CVD indicator. Confirmation is defined as the occurrence of two or more indicators (e.g. market price and CVD) corresponding with one another and thereby corroborating the predicted trend. For example, if the market is moving higher with true buying pressure, then higher prices should be confirmed with higher CVD values. Conversely, a market with prices moving lower should be confirmed with lower CVD values. A divergence is defined as a situation in which the price of a tradeable object and an indicator, move in opposite directions. For example, if market prices are moving higher while CVD is moving horizontally or lower, then CVD is signaling to the trader that more selling than buying is occurring in the market during the price rise. A divergence of lower prices with a horizontal to higher moving CVD line shows a trader that more buying pressure than selling pressure is taking place in the market as the prices move lower.

Figure 6:
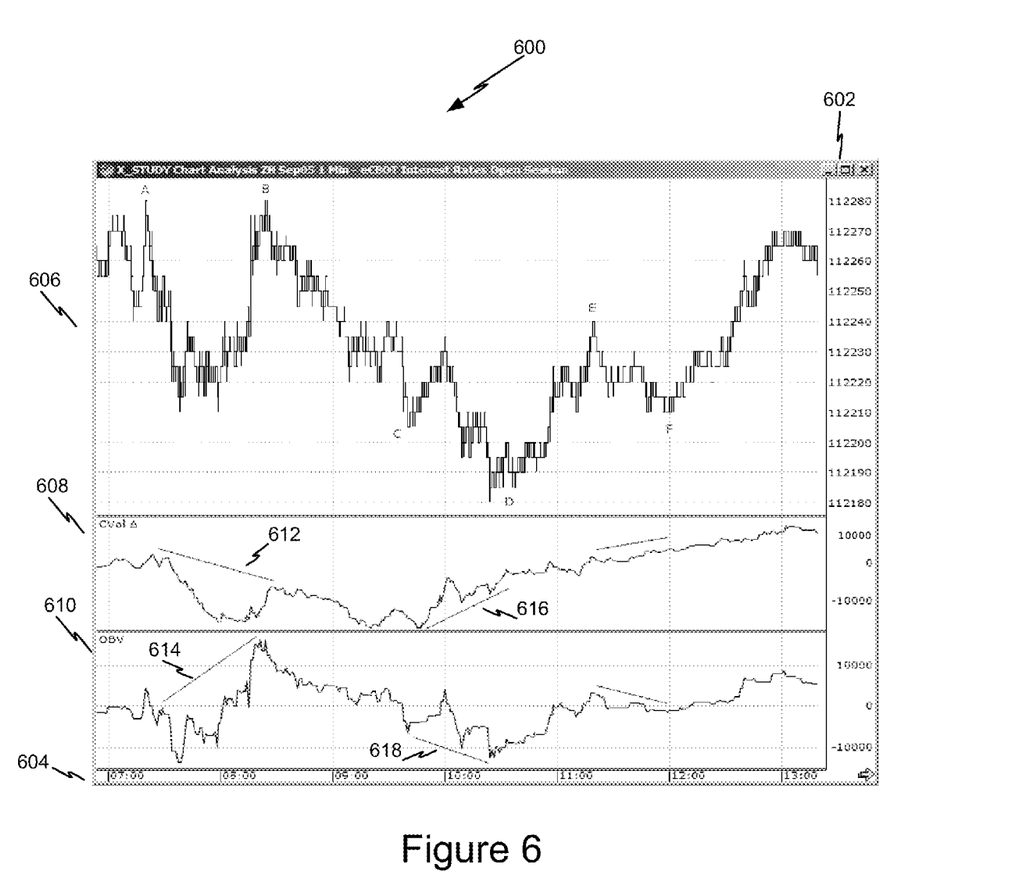
FIG. 6 is a graphically displayed chart illustrating the differences between Cumulative Volume Delta and the traditional On Balance Volume.

FIG. 6 is a graphically displayed chart illustrating differences between CVD and OBV. FIG. 6 is displaying a 1-minute bar chart for CBOT's Ten Year Note September Futures (ZN), with CVD and OBV plotted below. Chart 600 displays price chart 606, CVD chart 608, and the OBV chart 610.

Price chart 606 displays the historical trading chart for the given tradeable object. As trades are initiated by a trader, trades are displayed on price chart 606. Price chart 606 is similar to charts that traders use to analyze the movement of the market throughout a given time period. CVD chart 608 displays the historical CVD indicator in relation to the price chart 606 and the OBV chart 610. CVD is calculated using the method previously described in detail and the CVD indicator is then charted on the CVD chart 608 in FIG. 6. Likewise, OBV chart 610 displays the historical OBV volume in relation price chart 606 and the CVD chart 608. OBV is also calculated and then charted on the OBV chart 610.

Axis 602 includes the price range associated with price chart 606, and the volume ranges associated with the CVD chart 608 and OBV chart 610. As shown in FIG. 6, for the tradeable object, the price range associated with price chart 606 is between "112180" and "112280", and the volume range for CVD and OBV is between "10,000" and "–10,000". The volume range for CVD and OBV is based on what value is configured to be the start value; in this example the start value is "0". As previously described, the start value can be anything and is user configurable. Each trade is initiated at a specific time which can be shown on time axis 604. As shown on time axis 604 in chart 600, trades have been initiated just before 7:00 and about 13:30. The trader may choose to display all the trades that occurred since the start of day, or may choose to display a different time period, for example, 5 minutes, 1 day, or 30 days.

Price chart 606 also includes key points A, B, C, D, E and F. These points are displayed for purposes of description and will be further explained below. CVD chart 608 also includes key points at 612 and 616, and the OBV chart 610 includes key points at 614 and 618. It should be understood that the components of chart 600 may be altered as well as the position of each component, and what could be displayed should not be limited to what is shown in FIG. 6. For example, chart 600 may display a price chart 606 and a CVD chart 608, or for example, only CVD chart 608.

Referring now to the price chart 606 shown in FIG. 6, the market moved down from Point A on price chart 606. The downward market movement from price level "112280" on axis 602, at around time 7:20 AM on time axis 604, down to price level "112210" on axis 602, at around time 7:40 AM on time axis 604, was confirmed by lower volume values in both the CVD and OBV indicators. These lower values can be seen at 612 on CVD 608 and at 614 on OBV 610. Not only is the CVD indicator moving down, which indicates selling pressure, a trader will also understand that this means there is less volume being traded, and there were more traders trading at Point A than there were after the market moved down.

After the market stabilized around price level "112220" on axis 602, at around time 8:00 AM on time axis 604, the market moved back up to Point B on price chart 606. While the market prices on chart 606 moved up, the CVD indicator will show that the initial volume of traders trading in the market at point A was still higher than at point B, even though the prices reflect strong buying taking place. Both the CVD 608 and OBV 610 indicators represented the volume distinctly differently on their charts.

According to the CVD chart 608, the market had increased selling pressure at 612. In fact, at the peak Point B on price chart 606, CVD chart 608 had clearly displayed volume loss from more selling activity than buying activity while price was advancing on price chart 606. CVD more accurately confirmed the true pressures in the market. Although the price surged before Point B on price chart 606, CVD chart 608 showed downward movement, which illustrates that more traders were actually selling than buying at 612. A trader using the CVD chart 608, would see that the CVD indicator continues to move downward after 612, and would therefore look to the price chart 606 to confirm that the market prices would continue to fall again after the peak at Point B. CVD accurately assessed the selling pressure at 612, which is later confirmed in price chart 606 as the price falls after Point B.

The OBV chart 610 showed misleading buying pressure and volume of traders trading in the market at 614. A trader using the OBV chart 610, would be misled to buying into the market due to the divergence of the market prices in price chart 606 and the OBV chart 610. OBV chart 610 provided inaccurate information as to the true buying/selling pressure of the market at 614. From analyzing the OBV chart 610, a trader would also inaccurately believe that there were more traders participating in buying the market, which CVD proves is not the case at 612 with a decrease in the CVD indicator.

From Point B to Point C, the market falls the approximate price level of "112205" on axis 602, at around time 9:40 AM on time axis 604. The buying/selling activity from Point B down to Point C also produced a lower CVD indicator on CVD chart 608. The downward movement in the market confirms the CVD indicator in the CVD chart 608. The CVD chart 608 also implies that the market will continue falling due to heightened selling pressure, before rising up again.

From Point C to Point D on price chart 606, the market makes a short reversal in market movement from where the preceding market trend was going and price again falls lower to Point D. But as the price falls on price chart 606, the CVD chart 608 diverges and indicates increased buying pressure.

CVD chart 608 accurately displays the increased volume of traders in the market from point C to point D. CVD chart 608 was also warning and alerting traders that although the market prices were moving down in price chart 606, traders were buying and the market was about to move up, illustrated at 616.

Again, OBV chart 610 misrepresents what trades are actually initiating in the market. A trader analyzing the OBV chart 610 at 618, would recognize the divergence and believe the market was not going to rise, but alternatively, would continue falling. As can be seen in price chart 606, the market prices did move up and reacted as CVD chart 608 illustrated it would.

As shown from Point D to Point E, the CVD indicator on CVD chart 608, prices subsequently moved higher from Point D to Point E on price chart 606. Both CVD and OBV indicators moved higher along with the prices in price chart 606, however they again differed when the market reached Point F and rendered two different versions of what was happening in the market.

The CVD indicator is displayed horizontally to slightly upward, depicting a strengthening market and buying activity taking place. A trader analyzing the CVD chart 608 is going to hold their market position because there is more buying than selling taking place. As price chart 606 will confirm, the prices promptly moved higher after Point F on price chart 606 and peaked around price level "112270" on axis 602, at around time 1:00 on time axis 604.

OBV chart 610 is displayed horizontally to slightly downward, depicting a weakening market and selling activity taking place. Again, CVD and OBV differ and the result to the trader is a different view of what is happening in the market. Unfortunately, the OBV chart 610 displays a divergence between the market prices and the OBV indicator and would have led a trader astray many times, causing risk and possible lost profits.

Another example embodiment may include applying the CVD method to a sector, or a group of tradeable objects in the same industry or market. Applying the CVD method to an entire sector may provide information to a trader regarding the underlying aggressive actions (buying or selling) of a particular sector index. An increase or decrease in a CVD sector index indictor would indicate the total actions initiated by traders across all the tradeable objects that comprise the sector index.

Figure 7:
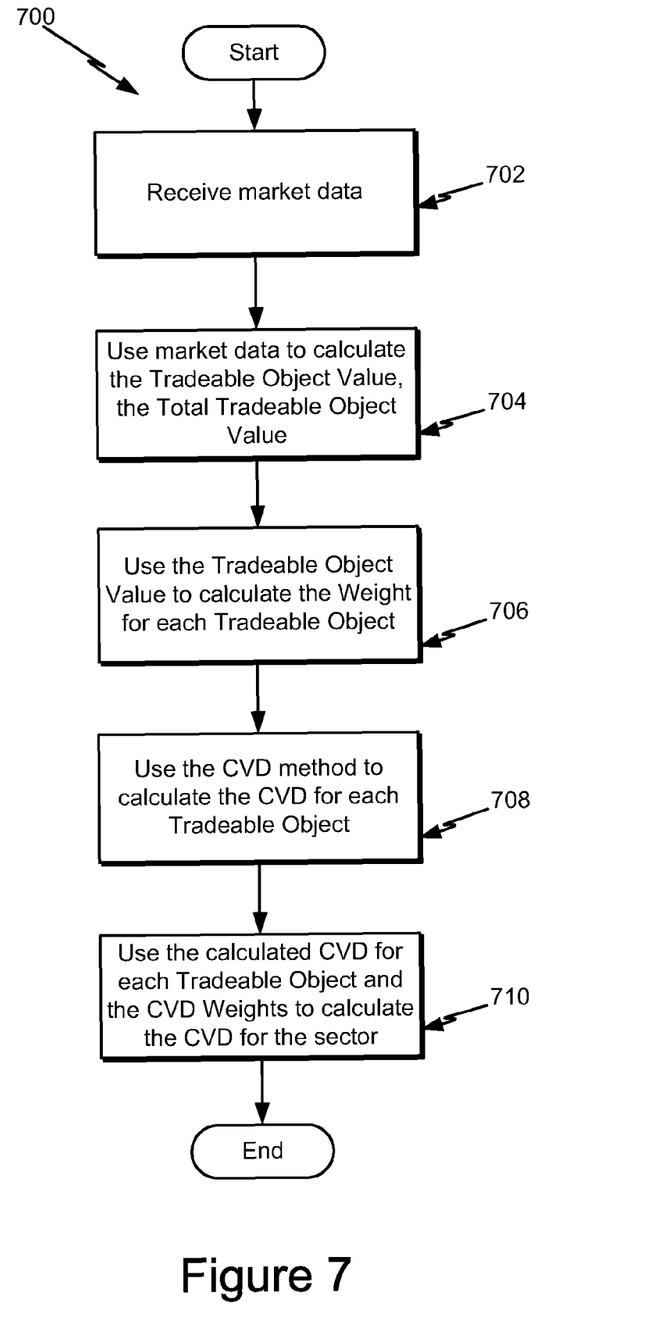
FIG. 7 is a flow chart illustrating a method for calculating Cumulative Volume Delta according to another embodiment.

FIG. 7 is a flow chart illustrating one example method 700 for calculating CVD for sector index. It should be understood that the flow chart in FIG. 7 only provides an illustrative description for calculating CVD indicator. In this regard, each block may represent a module, segment, or portion of code, which includes one or more executable instructions for implementing specific logical functions or steps in the process. Further, it should be understood that the steps of the method 700 illustrated in FIG. 7 may be performed by one or more network entities, such as a client device, gateway, and/or exchange, or a combination thereof, using the teachings described herein.

At step 702, the trading application, such as the one shown in FIG. 1, 2 or 3, receives market information from the electronic exchange. As previously described, the market information may include the inside market, last traded price and last traded quantity, as well as an exchange-provided point value for each tradable object.

At step 704 the trading application uses the market information received from the exchange to calculate the value of each tradeable object included in the sector index and the total index tradeable object value. The value of each tradeable object correlates to how much the specific tradeable object is worth at any given moment. To calculate the value of each tradeable object, the trading application, multiplies the point value for each tradeable object by the last traded price.

The point value associated with a tradeable object is a value provided by the electronic exchange. The point value is defined as the actual dollar value assigned to each price level or point. The pricing structure for each tradeable object is different, and in order to discuss the tradeable objects on the same level, a calculation is made to reduce them into a common denominator. If a point value for a tradeable object is defined to be "$10.00", then each price level or point that the tradeable object moves up is a "$10.00" profit for the trader. For example, if a trader submits a trade with a quantity of "1" at a price of "50" and the price moves up to the price level of "51", then the trader has made a profit of "$10.00".

Once each tradeable object value has been calculated the total index tradeable object value may be calculated. To calculate the total index tradeable object value, the calculated tradeable object values are added together.

At step 706 the CVD weights are calculated for each tradeable object. Each tradeable object accounts for a different percentage of value attributed to the sector; therefore each tradeable object is weighted differently. To determine the weight of each tradeable object, the trading application divides the tradeable object value for each tradeable object by the total index tradeable object value. The weight of each tradeable object can be represented as a percentage that defines how much volume of the total sector index volume that specific tradeable object accounts for.

At step 708, using the previously discussed CVD method, the CVD for each tradeable object included in the sector index is calculated.

At step 710, using the calculated CVD for each tradeable object and the calculated weights of each tradeable object, the trading application calculates the total CVD for the sector index. The sum of each tradeable object's CVD value multiplied by the weight of that tradeable object which results in the total CVD value for the sector index.

Figure 8:
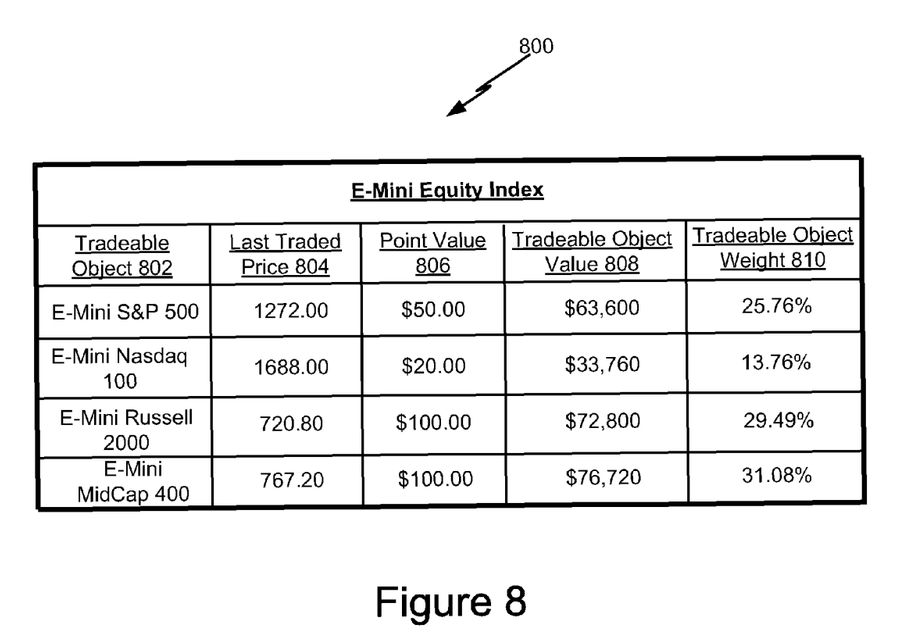
FIG. 8 is a table illustrating the market information used to calculate Cumulate Volume Delta across a sector index, according to the example embodiment of FIG. 7.

FIG. 8 is a table illustrating the information that is used to calculate CVD across a sector index. Table 800, contains the tradeable objects column 802 that displays an example set of tradeable objects in the E-Mini Equity Index, the current last traded price column 804 that defines the current last traded price for each of the tradeable objects making up the E-Mini Equity Index, the point value column 806 defines the point value assigned to each tradeable object by the exchange, the tradeable object value column 808 defines the calculated value for each tradeable object, and the tradeable object weight column 810 defines the calculated weight for each tradeable object.

As shown in table 800, the E-Mini Equity Index is made up of four equity index tradeable objects, displayed in the tradeable object column 802. The tradeable objects included in the E-Mini Equity Index are the E-Mini S&P 500, E-Mini Nasdaq 100, E-Mini Russell 200, and the E-Mini Midcap 400. The last traded prices 804 for the tradeable objects are "1272.00", "1688.00", "720.80", and "767.20", respectively. Likewise, the point values 806 for the tradeable objects are "$50.00", "$20.00", "$100.00", and "$100.00", respectively. The calculated value 808 for the tradeable objects are "$36,600", $33,760", "$77,800", and "$76,720", respectively. And the calculated weights 810 for the tradeable objects are "25.76%", "13.76%", "29.49%", and "31.08%", respectively.

Per step 702 shown in FIG. 7, the trading application receives market information from the electronic exchange that includes, among other things, the last traded price and the point value for each of the tradeable objects displayed in table 800.

Per step 704 shown in FIG. 7, using the received last traded price 804 and point value 806 for each tradeable object, the trading application calculates the tradeable object value for each tradeable object. The resulting tradeable object value 808 is displayed in table 800. The following calculation is made for each tradeable object 802 using the information found in table 800:

Tradeable Object Value=Last Traded Price*Point Value

Using the calculated tradeable object values, the total tradeable object value can be calculated as follows:

Total Tradeable Object Value=$63,600+$33,760+$72,800+$76,720=$246,880

Per step 706 shown in FIG. 7, using the calculated tradeable object values 808 for each tradeable object and the total tradeable object value, the weight 810 for each tradeable object can be calculated as follows:

Tradeable Object Weight=Tradeable Object Value/Total Tradeable Object Value

Per step 708 shown in FIG. 7, using the CVD method, previously discussed in detail, the CVD is calculated for each tradeable object, starting from the same value.

Per step 710 shown in FIG. 7, using the calculated weight 810 and the CVD for each tradeable object, the total CVD for the sector index can be calculated. The total CVD for the index can be calculated by multiplying the CVD of each tradeable object by the corresponding weight 810, and adding the results. The total CVD can be calculated is as follows:

CVD E-Mini Equity Index=(CVD of E-Mini S&P500*0.2576)+(CVD of E-Mini Nasdaq 100*0.1376)+(CVD of E-Mini Russell 2000*0.2949)+(CVD of E-Mini MidCap 400*0.3108)

A trader may compare the calculated CVD for the sector index to a previously calculated CVD for the same index or for another index. By comparing the CVD of an index from one time period to the CVD of the same index from another time period, the trader may determine if other traders are more aggressively buying or selling within that index between the two time periods. Likewise, by comparing the CVD values of two or more separate indexes, a trader may determine if the indexes have more buying activity or selling activity over each other.

CONCLUSION

The example embodiments described herein provide a method for analyzing the raw market information received from an electronic exchange. CVD determines the initiate nature of each trade, and uses that information to more accurately calculate and display the activity in the market. Using this information, traders can better assess what is happening in the market, why it is happening in the market, and what may happen next.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for calculating and displaying volume to identify accumulation and distribution may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for calculating a value associated with buying and selling a sector index comprising a plurality of tradeable objects being traded on an electronic exchange, the method comprising:

receiving at a computer device market information corresponding to each of the plurality of tradeable objects corresponding to the sector index, the market information comprising a last traded price, a last traded quantity for each tradeable object, and an inside market with a highest bid price and a lowest ask price currently available for each tradeable object;

comparing at the computer device the last traded price to the inside market for each tradeable object to determine if a last trade for each tradeable object occurred on a bid side or on an ask side based on received market information;

determining at the computer device a current running total volume for each tradeable object by adding or subtracting the last traded quantity to or from a preceding running total volume, based on the determination of whether the last trade occurred on the bid side or on the ask side; and determining at the computer device a current running total volume for the sector index using the current running total volume for each tradeable object and a weight value assigned to each of the plurality of tradeable objects within the sector index.

2. The method of claim 1, wherein the preceding running total volume comprises a user-configured value.

3. The method of claim 1, wherein determining the current running total volume for each tradeable object comprises:

determining that the last traded price is equal to the lowest ask price; and adding the last traded quantity to the preceding running total volume to determine the current running total volume.

4. The method of claim 1, wherein determining the current running total volume for each tradeable object comprises:

determining that the last traded price is equal to the highest bid price;

subtracting the last traded quantity from the preceding running total volume to determine the current running total volume.

5. The method of claim 1, wherein determining the current running total volume for each tradeable object comprises:

determining that the last traded price is higher than the lowest ask price; and adding the last traded quantity to the preceding running total volume to determine the current running total volume.

6. The method of claim 1, wherein determining the current running total volume for each tradeable object comprises:

determining that the last traded price is higher than the lowest ask price; and not adding the last traded quantity to the preceding running total volume to determine the current running total volume.

7. The method of claim 1, wherein determining the current running total volume for each tradeable object comprises:
determining that the last traded price is lower than the highest bid price; and
subtracting the last traded quantity from the preceding running total volume to determine the current running total volume.

8. The method of claim 1, wherein determining the current running total volume for each tradeable object comprises:
determining that the last traded price is lower than the highest bid price; and
not subtracting the last traded quantity from the preceding running total volume to determine the current running total volume.

9. The method of claim 1, further comprising:
displaying a value axis comprising a plurality of values in a chart region;
displaying a time axis comprising a plurality of times in the chart region; and
displaying an indicator representing the current running total volume for the sector index, wherein the indicator is being displayed in relation to the value axis and the time axis in the chart region.

10. The method of claim 1, further comprising:
calculating the weight value for each of the plurality of tradeable objects.

11. The method of claim 10, wherein the weight value is calculated using a point value and the market information for each of the plurality of tradeable objects.

12. The method of claim 11, wherein the weight value is calculated using the point value and the last traded price for each of the plurality of tradeable objects.

13. A non-transitory computer readable medium having program code for causing a microprocessor to execute a method for calculating a value associated with buying and selling a sector index comprising a plurality of tradeable objects being traded on an electronic exchange, comprising:
a first program code for receiving market information corresponding to each of the plurality of tradeable objects corresponding to the sector index, the market information comprising a last traded price, a last traded quantity for each tradeable object, and an inside market with a highest bid price and a lowest ask price currently available for each tradeable object;
a second program code for:
comparing the last traded price to the inside market for each tradeable object to determine if a last trade for each tradeable object occurred on a bid side or on an ask side based on received market information;
determining a current running total volume for each tradeable object by adding or subtracting the last traded quantity to or from a preceding running total volume, based on the determination of whether the last trade occurred on the bid side or on the ask side; and
determining a current running total volume for the sector index using the current running total volume for each tradeable object and a weight value assigned to each of the plurality of tradeable objects within the sector index.

14. The non-transitory computer readable medium of claim 13, wherein the preceding running total volume comprises a user-configured value.

15. The non-transitory computer readable medium of claim 13, wherein determining the current running total volume for each tradeable object comprises:
determining that the last traded price is equal to the lowest ask price; and
adding the last traded quantity to the preceding running total volume to determine the current running total volume.

16. The non-transitory computer readable medium of claim 13, wherein determining the current running total volume for each tradeable object comprises:
determining that the last traded price is equal to the highest bid price;
subtracting the last traded quantity from the preceding running total volume to determine the current running total volume.

17. The non-transitory computer readable medium of claim 13, wherein determining the current running total volume for each tradeable object comprises:
determining that the last traded price is higher than the lowest ask price; and
adding the last traded quantity to the preceding running total volume to determine the current running total volume.

18. The non-transitory computer readable medium of claim 13, wherein determining the current running total volume for each tradeable object comprises:
determining that the last traded price is higher than the lowest ask price; and
not adding the last traded quantity to the preceding running total volume to determine the current running total volume.

19. The non-transitory computer readable medium of claim 13, wherein determining the current running total volume for each tradeable object comprises:
determining that the last traded price is lower than the highest bid price; and
subtracting the last traded quantity from the preceding running total volume to determine the current running total volume.

20. The non-transitory computer readable medium of claim 13, wherein determining the current running total volume for each tradeable object comprises:
determining that the last traded price is lower than the highest bid price; and
not subtracting the last traded quantity from the preceding running total volume to determine the current running total volume.

21. The non-transitory computer readable medium of claim 13, wherein the second program code is further for:
calculating the weight value for each of the plurality of tradeable objects using a point value and the market information for each of the plurality of tradeable objects.

* * * * *